United States Patent [19]
Allinger et al.

[11] 3,764,927
[45] Oct. 9, 1973

[54] WIDE BAND FREQUENCY DISCRIMINATOR

[75] Inventors: William B. Allinger; Steven J. Davis, both of Norwalk, Conn.

[73] Assignee: General DataComm Industries, Norwalk, Conn.

[22] Filed: Dec. 7, 1971

[21] Appl. No.: 205,734

[52] U.S. Cl. ......... 329/104, 307/220 R, 307/225 R, 307/233, 328/20, 329/137

[51] Int. Cl. ............................................ H04l 27/14

[58] Field of Search ...................... 329/50, 104, 137, 329/138, 129, 130; 328/20; 307/233, 220 R, 220 B, 220 C, 225 R, 225 B, 225 C, 216, 271; 325/320

[56] References Cited

UNITED STATES PATENTS

| | | | |
|---|---|---|---|
| 3,022,461 | 2/1962 | Wilcox | 329/145 X |
| 2,756,336 | 7/1956 | Christensen | 325/320 X |
| 2,835,802 | 5/1958 | Day | 329/137 X |
| 2,961,613 | 11/1960 | Eschner | 329/137 |
| 3,054,064 | 9/1962 | Sherman | 329/137 |
| 3,388,336 | 6/1968 | Mattern | 329/50 X |
| 3,435,194 | 3/1969 | Peschon et al. | 307/216 X |
| 3,551,889 | 12/1970 | Miller | 325/320 X |

*Primary Examiner*—Alfred L. Brody
*Attorney*—Dean S. Edmonds et al.

[57] ABSTRACT

A wide band frequency discriminator is described having at its input a first RC network and first limiter in parallel with a second RC network and second limiter. The RC time constants and the configuration of these two parallel circuits are chosen so that the inputs to the two limiters have a 90° phase difference. An EXCLUSIVE OR combines the outputs of the two limiters to produce a square wave having twice the frequency of the input signal. A differentiating circuit and one-shot further process the square wave signal to form a signal having four times the frequency of the input signal. The frequency of the input signal may then be detected by passing the output of the one-shot through a low-pass filter.

17 Claims, 7 Drawing Figures

WIDE BAND FREQUENCY DISCRIMINATOR

SUMMARY OF THE INVENTION

This concerns a frequency discriminator and in particular a wide band frequency quadrupler especially useful in frequency detection.

Numerous frequency discrimination circuits are available in the prior art. These devices, however, are generally fairly complicated and are operable only for signals having a very narrow frequency range. To avoid these limitations of the prior art, we have devised a simple, easily fabricated frequency discriminator that is operable over relatively wide frequency ranges such as those between 70 Hertz and 20 kilohertz. The input of our discriminator is a frequency doubler comprising two parallel circuits, each containing an RC network and a limiter, and a signal combining means that preferably is an EXCLUSIVE OR. The time constants of the RC networks are equal and their configurations are such that the inputs to the limiters, and therefore the outputs, are 90° out of phase. As a result, the inputs to the EXCLUSIVE OR are two square waves that are 90° out of phase with each other and the output of the EXCLUSIVE OR is a square wave having twice the frequency of the input signal. A differentiating circuit and a one-shot further process the output of the EXCLUSIVE OR to form a signal having four times the frequency of the input signal. The frequency of the input signal may then be detected by passing the output of the one-shot through a low-pass filter.

BRIEF DESCRIPTION OF THE DRAWING

These and other objects, features, and elements of our invention will be more readily apparent from the following detailed description of the drawing in which.

DETAILED DESCRIPTION OF THE DRAWING

Figure 1:
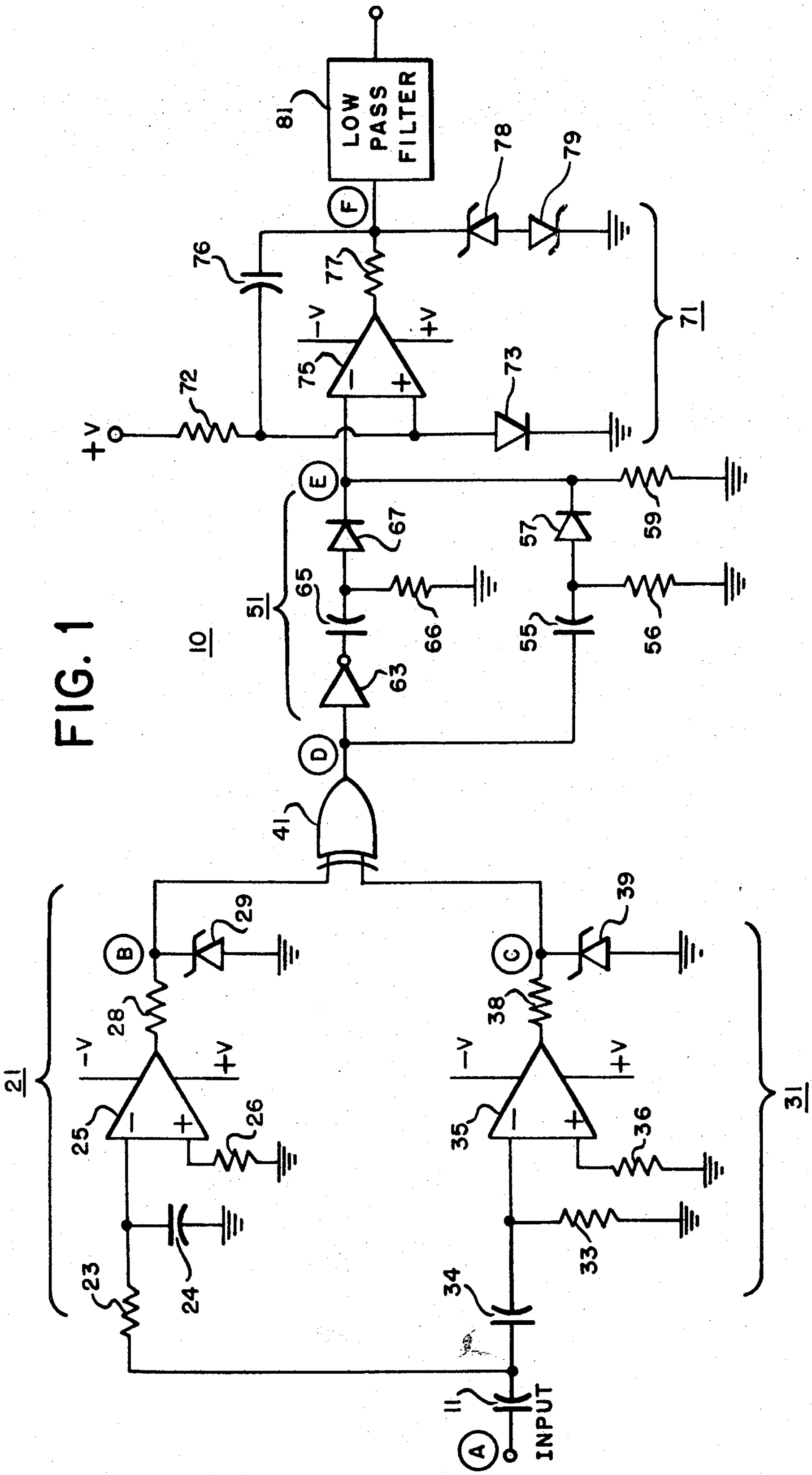
FIG. 1 is a schematic representation of an illustrative embodiment of our invention.

An illustrative frequency discriminating circuit of our invention is shown as circuit 10 of FIG. 1. Circuit 10 comprises a coupling capacitor 11, a first phase shifting and limiting circuit 21, a second phase shifting and limiting circuit 31 in parallel with circuit 21, signal combining means 41, differentiating circuit 51, one-shot circuit 71, and a low-pass filter 81. Phase shifting and limiting circuit 21 comprises resistors 23, 26, and 28, capacitor 24, high gain amplifier 25, and Zener diode 29. Resistor 23 and capacitor 24 will be recognized as constituting a low-pass filter connected to the inverting input terminal of amplifier 25. The noninverting input terminal of amplifier 25 is connected through resistor 26 to ground. Zener diode 29 limits the voltage output of amplifier 25, and resistor 28 protects diode 29 from burn out. Similar elements are shown in phase shifting and limiting network 31 with the exception that capacitor 34 and resistor 33 provide a high-pass filter connected to the inverting input terminal of amplifier 25. The RC time constants of the low-pass filter formed by resistor 23 and capacitor 24 and the high-pass filter formed by capacitor 34 and resistor 33 are chosen to be equal. As a result, it can readily be shown that the phase difference between the input signals to the inverting input terminals of amplifiers 25 and 35 is 90° over an extremely wide range of input frequencies, the phase leading in circuit 31 and lagging in circuit 21. Amplifiers 25 and 35 preferably are high gain amplifiers that saturate at their power supply voltages, +V and −V.

The output signals from circuits 21 and 31 are combined by signal combining means 41 in accordance with the rules of EXCLUSIVE OR logic. Preferably, signal combining means 41 is an EXCLUSIVE OR logic gate.

The output of signal combining means 41 is further processed by differentiating circuit 51. This circuit is a conventional circuit that differentiates the output of signal combining means 41 and its inverse. The output is differentiated by a high-pass RC circuit comprising capacitor 55 and resistor 56. The output of signal combining means 41 is also inverted by invertor 63 and differentiated by a second high-pass RC circuit comprising capacitor 65 and resistor 66. Diodes 57 and 67 pass only positive pulses from the RC differentiating circuits; and these diodes and resistor 59 constitute an OR gate that combines positive derivatives of the output of signal combining means 41 and the inverse of said output.

This combined signal, which is a series of pulses, is then applied to a conventional one-shot circuit 71. Circuit 71 comprises resistors 72 and 77, amplifier 75, capacitor 76, diode 73, and Zener diodes 78 and 79. The output of differentiating circuit 51 is connected to the inverting input terminal of amplifier 75. The noninverting input terminal is connected through diode 73 to ground. Circuit 71 is normally in a quiescent state in which the voltage at the noninverting input terminal of amplifier 75 is positive. For this condition, the output of amplifier 75 is high When a positive pulse is applied from differentiating circuit 51 to the inverting input terminal of amplifier 75, the amplifier switches rapidly to its low output state. Thereafter, the charge on capacitor 76 gradually builds up at a rate determined by the RC time constant of resistor 72 and capacitor 76. When the voltage at the node between resistor 72 and capacitor 76 exceeds zero volts, the amplifier is immediately switched back to its quiescent state.

The RC time constant of resistor 72 and capacitor 76 is, of course, chosen so that the amplifier returns to its quiescent state before the next pulse from differentiating circuit 51 is applied to its inverting input terminal. As a result, the output of one-shot 71 is a series of rectangular pulses having a pulse width determined by the RC time constant of resistor 72 and capacitor 76 and a spacing determined by the frequency of the pulses from differentiating circuit 51.

The pulses from one-shot 71 are then applied to low-pass filter 81 for frequency detection. Specifically, filter 81 averages out the DC component in its input pulses and detects the spacing in these pulses. The more frequent the input pulses, the higher the output voltage; and the less frequent, the lower the voltage. Thus, low-pass filter 81 provides frequency discrimination.

Figure 2:
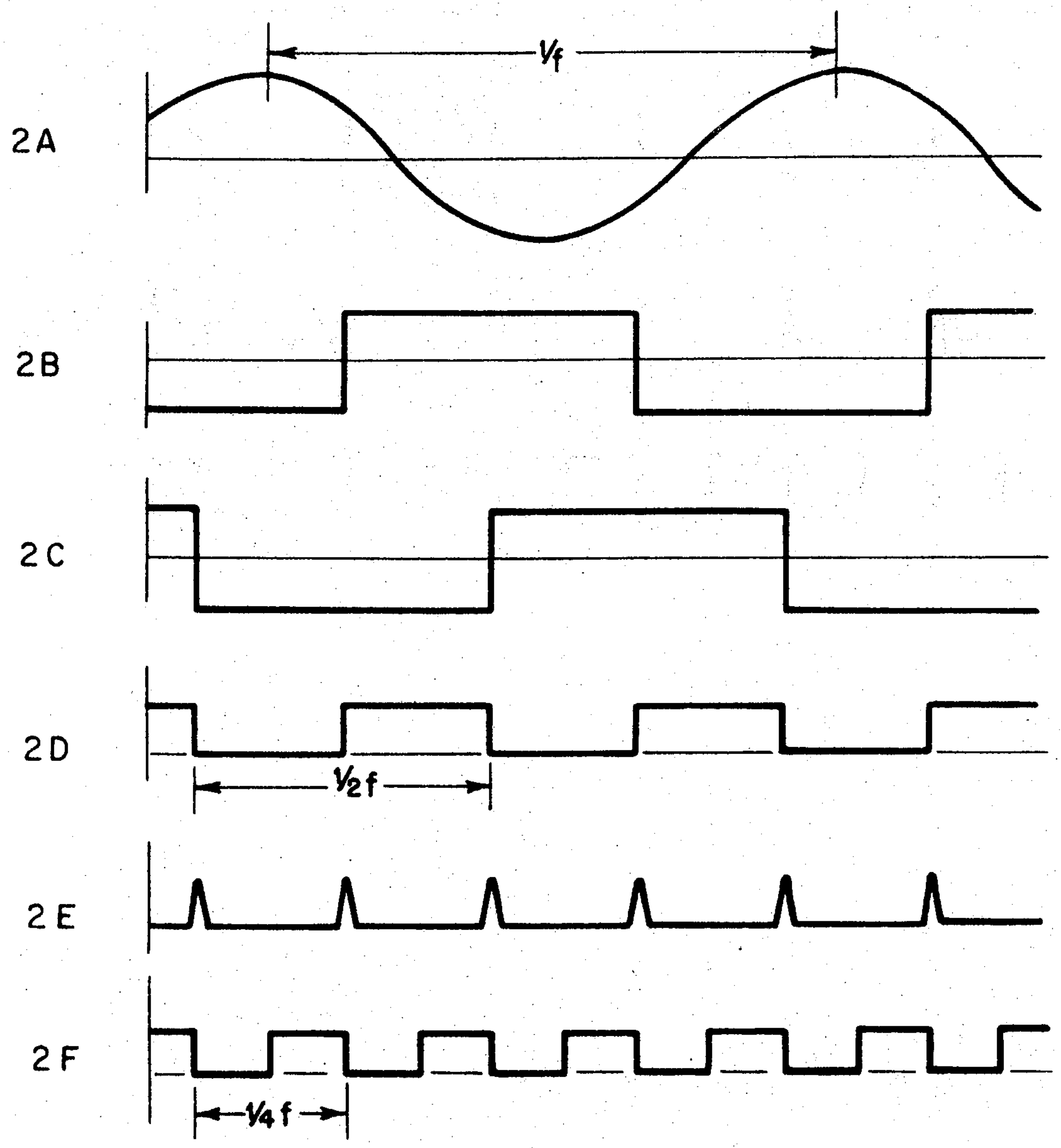
FIGS. 2A–2F are wave forms useful in understanding the operation and interrelation of the various elements of the illustrative embodiment of FIG. 1.

The operation of circuit 10 may best be understood in conjunction with the signal wave forms depicted in FIGS. 2A–2F. The input signal at A is a frequency modulated signal (F.S.K. modulation) representative of digital data. This signal is shown in FIG. 2A as a sinusoidal signal having a frequency f. This signal is coupled by capacitor 11 to parallel phase shifting and limiting networks 21 and 31. The low-pass RC filter comprising resistor 23 and capacitor 24 in network 21 introduces into the input signal a phase change $\theta = -\arctan 2\pi RCf$ where R is the resistance of resistor 23 and C is the resistance of capacitor 24. Simultaneously, the high-pass RC filter comprising capacitor 34 and resistor 33 in network 31 introduces into the input signal a phase change $\theta = \arctan (\frac{1}{2}\pi RCf)$ where R is the resistance of resistor 33 and C is the resistance of capacitor 34. Because the RC time constants of the high-pass filter and the low-pass filter are the same, the phase difference between the signals at the inputs to amplifiers 25 and 35 is 90° over a wide range of input frequencies.

Amplifiers 25 and 35 change the sinusoidal inputs at their inverting input terminals into square wave signals having equal amplitudes. As a result, the output of amplifier 35 as detected at point B is the square wave output shown in FIG. 2B; and the output of amplifier 35 as detected at point C is the square wave output shown in FIG. 2C. Note that the signal at B leads the signal at C by 90°.

Signal combining means 41 combines the signals at B and C in accordance with the rules of EXCLUSIVE OR logic. As a result, the output of signal combining means 41 at D is as shown in FIG. 2D where the frequency is now twice that of the input signal frequency.

The signal from combining means 41 and the inverse of this signal are then differentiated by differentiating circuit 51 and recombined. The recombined signal, as detected at E, is shown in FIG. 2E.

This signal is then applied to one-shot circuit 71 to produce a substantially rectangular wave output having a pulse width determined by the RC time constant of resistor 72 and capacitor 76 and a pulse spacing determined by the frequency of the pulses from differentiating circuit 51. This signal, as detected at F, is shown in FIG. 2F. Note that the frequency of this rectangular wave is four times that of the frequency of the input signal.

The output of one-shot 71 is then applied to low-pass filter 81 which detects the frequency of the input signal. Because the frequency of the frequency modulated input signal has been quadrupled before being applied to the low-pass filter, this simple filter may be used to demodulate the frequency modulated input signal even when the data rate is greater than the frequency of the carrier of the frequency modulated signal. Previously, if the data rate in bits per second exceeded the carrier frequency in Hertz, complex apparatus was required to detect a frequency modulated signal.

Digital data may also be encoded by phase encoding (P.S.K. modulation). In this case, that part of our circuitry between the input and point D can be used to form a signal having twice the frequency of the input signal; and the phase-coded information may be detected by applying the output of signal combining means 41 to a phase detector.

As will be obvious to those skilled in the art, further stages of frequency multiplication may readily be obtained. Thus, the output of signal combining means 41 may be applied to a low-pass filter to produce a sinusoid having twice the frequency of the input signal; and this signal may then be applied to the input of a circuit similar to circuit 10 of FIG. 1. This process may be repeated as many times as necessary to achieve the desired multiplication factor.

As will also be obvious, the particular apparatus used in the above described embodiment of our invention is only illustrative. Numerous other circuits may be used for signal combining means 41, differentiating means 51, and one-shot 71. It is only necessary that these circuits provide the functions described above. Similarly within the broad class of devices called limiters, there will be found other devices than the high gain amplifiers 25 and 35 that are used to convert sinusoidal inputs to square wave outputs.

Numerous applications of our invention will be apparent to those skilled in the art. For our purposes, we have found our invention useful as an F.S.K. modulation detector for input frequencies ranging from 100 Hertz to 4 kilohertz. For this application we use resistors 23 and 33 having a resistance of 6.8 kilohms and capacitors 24 and 34 having a capacitance of 0.01 microfarads. Typical high gain amplifiers we use are the type 709 amplifiers such as the model LM-709 amplifier available from National Semiconductor. Voltage supply levels +V and −V are about +12 and −12 volts. Resistors 28 and 38 have resistances of 5.6 kilohms; and resistors 26 and 36 have resistances of 6.8 kilohms to balance the impedance at the input signal terminals. Zener diodes 29 and 39 are model 1N750 diodes available from Texas Instruments having a Zener breakdown voltage of about 4.9 volts.

Signal combining means 41 in the practice of our invention is a TTL EXCLUSIVE OR gate available as model SN7486 from Texas Instruments. Differentiating circuit 51 is a conventional circuit in which the capacitance in each of the high-pass filters is 470 picofarads and the resistance is 10 kilohms. Inverter 63 is a standard TTL inverter such as the SN7404 available from Texas Instruments. Diodes 57 and 67 are 1N914 diodes also available from Texas Instruments; and resistor 59 has a 10 kilohm resistance.

For one-shot circuit 71, amplifier 75 is a model 709 amplifier and diode 73 is a 1N914 diode. Resistor 72 has a resistance of 10 kilohms and resistor 77 has a resistance of 750 ohms. Capacitor 76 has a capacitance of 0.0068 microfarads. Zener diodes 78 and 79 are model 1N750 diodes.

As will be obvious to those skilled in the art, numerous other modifications may be made to the preferred embodiment described and illustrated herein without departing from the invention as defined in the claims.

What we claim is:

1. A wide band frequency discriminator comprising:

a first RC network and a first limiter that form a first output signal;

a second RC network and a second limiter in parallel with the first RC network and first limiter, said second RC network and second limiter forming a second output signal;

an input to said first and second RC networks;

said first and second RC networks having the same RC product and a configuration such as to produce a 90° phase difference between the signals at outputs of the two limiters;

means for combining the first and second output signals to produce a third output signal;

means for further processing the third output signal including a one-shot; and a low-pass filter to which is applied the output of the one-shot, said low-pass filter detecting variations in the frequency of an input signal to the first and second RC networks.

2. The discriminator of claim 1 wherein the means for combining the first and second output signals is an EXCLUSIVE OR.

3. The discriminator of claim 1 further comprising means for differentiating the third output signal.

4. The discriminator of claim 3 wherein the one-shot has an input connected to the output of the differentiating means.

5. The discriminator of claim 1 wherein the first and second limiters are substantially identical high gain amplifiers that are driven to saturation at their power supply voltages.

6. A wide band circuit for processing an input signal comprising:

a first RC network and a first limiter that form a first output signal;

a second RC network and a second limiter in parallel with the first RC network and first limiter, said second RC network and second limiter forming a second output signal;

an input to said first and second RC networks;

said first and second RC networks having the same RC product and a configuration such as to produce a 90° phase difference between the signals at outputs from the two limiters; and means for combining the first and second output signals to produce a third output signal having twice the frequency of the input signal.

7. The circuit of claim 6 wherein the means for combining the first and second output signals is an EXCLUSIVE OR.

8. The circuit of claim 6 further comprising means for differentiating the third output signal.

9. The circuit of claim 8 further comprising a one-shot having an input connected to the output of the differentiating means.

10. The circuit of claim 9 further comprising a low-pass filter to which is applied the output of the one-shot, said low-pass filter detecting variations in the frequency of the input signal to the wide band circuit.

11. The circuit of claim 6 wherein the first and second limiters are substantially identical high gain amplifiers that are driven to saturation at their power supply voltages.

12. A wide band circuit for processing an input signal comprising:

a first limiter for forming a first output signal;

a second limiter in parallel with said first limiter for forming a second output signal;

an input to said first and second limiters;

means between said input and both of said limiters for producing a 90° phase difference between the first and second output signals by producing a phase lead in one signal and a phase lag in the other signal; and means for combining the first and second output signals to produce a third output signal having twice the frequency of the input signal.

13. The circuit of claim 12 wherein the means for combining the first and second output signals is an EXCLUSIVE OR.

14. The circuit of claim 12 further comprising means for differentiating the third output signal.

15. The circuit of claim 14 further comprising a one-shot having an input that is connected to the output of the differentiating means.

16. The circuit of claim 15 further comprising a low-pass filter to which is applied the output of the one-shot, said low-pass filter detecting variations in the frequency of the input signal to the wide band circuit.

17. The circuit of claim 12 wherein the first and second limiters are substantially identical high gain amplifiers that are driven to saturation at their power supply voltages.

* * * * *